J. K. DELANO.
SYSTEM OF ELECTRICAL DISTRIBUTION.
APPLICATION FILED JULY 21, 1920.
1,392,252.
Patented Sept. 27, 1921.
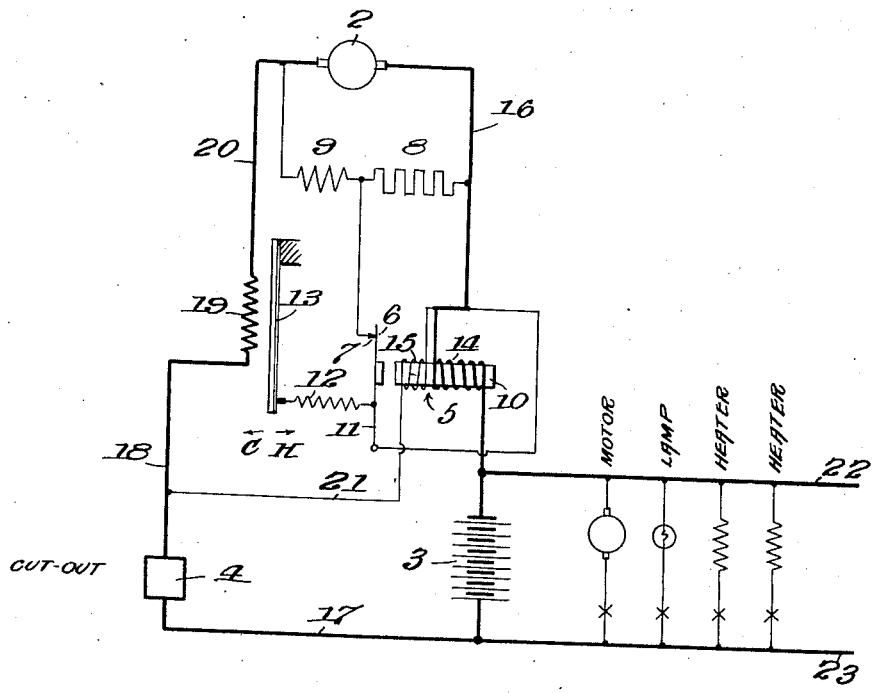

UNITED STATES PATENT OFFICE.

JAMES KENDALL DELANO, OF NEW YORK, N. Y.

SYSTEM OF ELECTRICAL DISTRIBUTION.

1,392,252.          Specification of Letters Patent.    Patented Sept. 27, 1921.

Application filed July 21, 1920. Serial No. 397,963.

*To all whom it may concern:*

Be it known that I, JAMES K. DELANO, a citizen of the United States, residing at New York, county of New York, and State of New York, have invented certain new and useful Improvements in Systems of Electrical Distribution; and I do hereby declare the following to be a full, clear, and exact description of the invention, such as will enable others skilled in the art to which it appertains to make and use the same.

My invention relates to systems of electrical distribution; and it relates more particularly to storage battery charging systems.

Although not limited in its broader aspects to use in any specific type of battery charging system, the invention is especially directed to systems using light weight batteries, such as airplane systems, where the normal charging rate is extremely low because of the thin battery plates and relatively small amount of electrolyte employed. In such a system the charging rate on a twelve volt battery is from about five amperes maximum initial charging rate to about three amperes continuous or finishing charging rate. However, it is possible to charge such batteries at an excessive rate for a relatively short period of time, for example, at fifteen to twenty amperes for two or three minutes, without overheating the electrolyte sufficiently to cause damage, which rate may be increased at high altitudes due to low temperatures there prevailing.

A principal object of the present invention is therefore to provide a system of electrical distribution in which timing means, and especially temperature-responsive timing means, operates to vary an adjustable current regulator.

A further object of the invention is to provide an arrangement in which the battery will receive an initial charge at an excessive rate for a period of time dependent upon the initial temperature.

Another object is to provide a novel form of vibrator regulator which will be self-compensating for external temperature changes so as to give automatic summer and winter regulation of the charging rate.

Other objects and novel features of the invention will be apparent from the description hereinafter given and from the appended claims.

A preferred embodiment of my invention is disclosed in detail in the following specification and drawing accompanying the same.

The drawing shows diagrammatically an especially desirable combination and arrangement of apparatus and circuits embodying my invention in practical form.

Referring to the drawing in detail, the invention is here shown, for purposes of illustration, as applied to the electrical supply system of an airplane using a shunt generator 2, and storage battery 3, supplying current to the various translating devices used on an airplane such as a starting motor, lamps, and heating devices brought into use at low temperatures for heating carbureter, aviator's gloves, etc. An automatic cut-out 4 is included in the charging circuit, the mechanism and control circuits of the cut-out being omitted for the sake of simplicity, it being understood that such may be of any known or suitable form operable to connect and disconnect the battery and the generator and its appurtenances according to whether or not the generator is in proper condition for charging.

The regulator 5 is of the vibrating contact type comprising the vibratory contact 6 and stationary contact 7, connected in shunt of a resistance 8, which resistance is connected in series with the shunt field winding 9 of the generator. The vibrator contact 6 is operated by an electro-magnet 10 arranged to pull the contact arm 11 in a direction to open the contacts 6—7. A retractile spring 12 is mechanically connected between the movable end of thermostatic strip 13 and the contact arm 11 and tends normally to hold the contacts 6—7 closed. The thermostat is so arranged that its free end will move in the direction indicated by the arrow C upon a decrease in temperature and in the direction of the arrow H upon an increase in temperature, thus varying the tension of the spring 12, which in turn varies directly the amount of force required to separate the contacts 6—7. Energization of the electromagnet 10 is effected by means of the current and voltage windings 14 and 15, respectively, the current winding being connected in series in the battery charging circuit, the path of which leads from generator 2, over conductor 16, winding 14, battery 3, conductor 17, cut-out 4, conductor 18, heating coil 19 and conductor 20 back to generator 2, the voltage coil 15 being permanently connected across the terminals of the generator through conductors 16, 21, 18. Heating coil 19, which is included in the charging circuit previously traced, is arranged in such operative relation to the thermostat 13 as to impart heat to the same, the two elements acting together as an electric thermo-motor means operable to adjust the tension of the spring 12; while the thermostat, also acts alone to vary the tension of the spring 12 according to variations in external temperature. Thus the vibrator contact 6 is acted upon conjointly by the electro-magnet 10 and the electric thermo-motor element constituted by the thermostat and its heating coil, in response to variations in the voltage of the generator and the volume of the charging current, the effect of the electro-magnet 10 varying substantially instantaneously in accordance with variations in the generator voltage and current output, and the effect of the electric thermo-motor means varying in accordance with the algebraic sum of the controlling factors represented by temperature, volume of charging current, and duration of closure of the charging circuit. Leads 22 and 23, connected across the terminals of the battery 3, supply current to the various translating devices as indicated on the drawings.

In practice the parts are so adjusted that at a given normal atmospheric temperature, with the generator at rest and the thermostat at the atmospheric temperature, the retractile spring 12 will be so over-tensioned as to adjust the regulator 5 to permit an excessive charging rate.

In operation, assuming the generator to be started from a condition of rest, with the thermostat 13 at substantially atmospheric temperature and the cut-out 4 open, the generator builds up until the voltage becomes sufficient to charge the battery, whereupon the cut-out 4 operates in a known manner to close the charging circuit through conductors 17 and 18, which circuit may be traced from generator 2, through 16, 14, 3, 17, 4, 18, 19, and 20 back to generator 2. As the generator speed increases, the voltage increases, increasing the volume of charging current until the excessive rate, say twenty amperes, at which the regulator 5 is set, is reached; after which vibrator contacts of the regulator 5 operate in a known manner to hold the charging rate below the limit set. The charging current traversing the heating coil 19 causes it to gradually heat the thermostat, which causes the free end of the thermostat to move in the direction of the arrow H, reducing the tension of the retractile spring 12 and accordingly varying the adjustment of the regulator 5 to a lower charging rate until, after a period of say three minutes, for example, it is reduced to the continuous charging rate for which the battery is designed, say three amperes. The parts now assume a balanced condition which tends to maintain this charging rate constant, the effect of the heating coil 19 on the thermostat being controlled by the regulator 5. However, upon the occurrence of a drop in atmospheric temperature, as when, in the case of an airplane installation, the machine reaches high altitudes, the thermostat moves in the direction of the arrow C which increases the tension of the retractile spring 12 adjusting the regulator 5 to permit an increase in the generator out-put in accordance with the amount of temperature variation. The purpose of this is to effect an increase in the charging rate, something which is permissible at low temperatures, and also to satisfy the increased demand for current for certain translating devices such as heaters which may be brought into use at low temperatures either automatically or at the will of the aviator. Most desirably the thermostatic control for the current regulator is so located as to be unaffected by the heating effect of the generator and regulator coils or the temperature of the accompanying machine parts. Said control is therefore promptly responsive to changes in atmospheric or external temperature and to the action of the heating coil 19. It will be noticed that the operation of the electric thermo-motor element constituted by the thermostat and its heating coil, is to coördinate the three factors of time, temperature and charging rate in such manner as to cause the battery to receive the maximum amount of charge permissible under the conditions existing at any given time. For example, if, in starting up, the generator speed is so low that the charging rate is not brought up to the temporary excessive charging limit to which the regulator is set, but to a lower rate, of say ten amperes, the temperature remaining the same, the time element (duration of overcharging) will be increased. It will also be clear that an increase in atmospheric temperature will adjust the regulator to a lower excessive charging rate and also reduce the time factor as the thermostat will heat more quickly due to the higher initial temperature and does not have to move so far in order to adjust the regulator to the lower or continuous charging rate. Conversely, a decrease in atmospheric temperature will increase both the excessive charging rate and the time factor.

While I have herein shown and described specifically, a preferred embodiment of my invention, it is to be understood that I do not limit myself to such specific embodiment but contemplate all such modifications and variants thereof as fairly fall within the scope of the appended claims.

What I claim is:

1. In a system of electrical distribution, the combination, with a generator and an adjustable automatic current regulator therefor, of thermostatic means for varying the adjustment of said regulator, and timing means operable by the regulated current to vary the time period of operation of said thermostatic means.

2. In a system of electrical distribution, the combination, with a generator and an adjustable automatic current regulator therefor, of thermostatic means for varying the adjustment of said regulator, said thermostatic means being so located as to be unaffected by the generator temperatures and to be promptly responsive to changes in atmospheric temperature, and a current coil in circuit with the generator and operative, upon changes in the regulated current, also to affect the adjustment of said regulator.

3. In a storage battery charging system including a variable speed generator, an adjustable automatic current regulator operable to regulate the current delivered by the generator to the battery and normally adjusted to an initial charging rate, and timing means operable to adjust said regulator to a finishing charging rate.

4. In a storage battery charging system including a variable speed generator, an adjustable automatic current regulator operable to regulate the current delivered by the generator to the battery, and timing means operable to vary the adjustment of said regulator.

5. In a storage battery charging system, the combination, with a generator and an adjustable current regulator therefor, of automatic means for adjusting said regulator in accordance with predetermined operating conditions, said means being responsive to and operable in part by variations in atmospheric temperature and in part by flow of the regulated current, said means being so located as to be unaffected by the heat of the generator.

6. In a storage battery charging system, an adjustable current regulator, and timing means operable in response to the flow of the regulated current for an appreciable length of time to adjust said regulator to permit an increased flow of current, said timing means being arranged to respond to variations in external temperature and in volume of the regulated current to effect said adjustment after a period of time varying in an inverse relation to the external temperature and current volume.

7. In a storage battery charging system, an adjustable automatic regulator normally adjusted to hold the charging rate below a given maximum, and means operable automatically to adjust said regulator to a different charging rate in response to the flow of the regulated current for a period of time varying in accordance with the external temperature and the charging rate.

8. In a storage battery charging system having a variable speed shunt field generator with a vibrator regulator for the field, said regulator having temperature-responsive means for adjusting the same in accordance with external temperature changes; the combination of heating means for the temperature-responsive means operable in response to variations in the volume of the charging current.

9. In a system of electrical distribution, a generator having a shunt field winding, electro-magnetic means having its energizing circuit connected in shunt of the generator armature, electric thermo-motor means having an energizing circuit connected in series with the line circuit of the generator, and means operated conjointly by said electro-magnetic means and said electric thermo-motor means for varying the resistance of the said shunt field winding.

In testimony whereof I hereunto affix my signature.

JAMES KENDALL DELANO.